United States Patent
Nguyen et al.

(10) Patent No.: US 7,650,308 B2
(45) Date of Patent: Jan. 19, 2010

(54) AUTO SUBSTANTIATION FOR OVER-THE-COUNTER TRANSACTIONS

(75) Inventors: Loc Nguyen, San Francisco, CA (US); Stacy Pourfallah, Oakland, CA (US); Janet Pruitt, Mill Valley, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 345 days.

(21) Appl. No.: 11/230,761

(22) Filed: Sep. 20, 2005

(65) Prior Publication Data
US 2006/0149670 A1 Jul. 6, 2006

Related U.S. Application Data

(60) Provisional application No. 60/641,483, filed on Jan. 4, 2005, provisional application No. 60/641,464, filed on Jan. 4, 2005, provisional application No. 60/641,597, filed on Jan. 4, 2005.

(51) Int. Cl.
*G06Q 40/00* (2006.01)
(52) U.S. Cl. .......................................... 705/40; 705/39
(58) Field of Classification Search .................... 705/1, 705/40, 39, 4, 38, 35, 64, 18, 41, 26; 235/380, 235/381, 487, 379; 340/5; 707/3
See application file for complete search history.

(56) References Cited

U.S. PATENT DOCUMENTS

| | | | |
|---|---|---|---|
| 6,629,081 B1 * | 9/2003 | Cornelius et al. | 705/30 |
| 2002/0002534 A1 | 1/2002 | Davis et al. | |
| 2002/0198831 A1 * | 12/2002 | Patricelli et al. | 705/40 |
| 2004/0039693 A1 | 2/2004 | Nauman et al. | |
| 2004/0148203 A1 | 7/2004 | Whitaker et al. | |
| 2005/0015280 A1 * | 1/2005 | Gabel et al. | 705/2 |
| 2005/0038675 A1 | 2/2005 | Siekman et al. | |
| 2008/0071646 A1 * | 3/2008 | Hodson et al. | 705/27 |

OTHER PUBLICATIONS

"Recal Introduces WebSentry Reducing the Risk of Fraud for Internet Transactions; WebSentry Offers System Integrators Cost Effective SET Compliance for E-Commerece"—Canadian Corporate News May 26, 1999.*

* cited by examiner

*Primary Examiner*—Mary Cheung
*Assistant Examiner*—John H Holly
(74) *Attorney, Agent, or Firm*—Bradley K. DeSandro; Quarles & Brady LLP

(57) ABSTRACT

A flexible spending account system can be implemented according to one embodiment of the invention so as to automatically substantiate purchases made at a retailer merchant. For example, according to one embodiment of the invention, a method of authorizing products for purchase can be implemented by determining via a computer that a product requested for purchase at a point of sale by a consumer matches a qualified product category under the flexible spending account, sending an authorization request message for requesting use of said flexible spending account of said consumer, wherein said authorization request message comprises a total purchase amount field and a first qualified amount field for a first type of qualified items.

24 Claims, 15 Drawing Sheets

| ... | TOTAL AMOUNT OF PURCHASE | TOTAL AMOUNT OF QUALIFIED PRODUCT ITEMS |
|---|---|---|

| ... | TOTAL AMOUNT OF PURCHASE | TOTAL AMOUNT FOR FIRST TYPE OF QUALIFIED PRODUCT | TOTAL AMOUNT FOR SECOND TYPE OF QUALIFIED PRODUCT |
|---|---|---|---|

FIG. 8

| ... | TOTAL AMOUNT OF PURCHASE | PRODUCT CODE | SALES AMOUNT | TAX AMOUNT |
|---|---|---|---|---|

FIG. 9

| STANDARD SETTLEMENT RECORD | TRANSACTION RECORD |
|---|---|

FIG. 13

| PRODUCT CODE | QUANTITY | ITEM DESCRIPTOR | LINE ITEM AMOUNT | TAX | LINE ITEM TOTAL | PRODUCT CATEGORY CODE |
|---|---|---|---|---|---|---|

FIG. 14

| 1500 | PRODUCT CODE | LINE ITEM TOTAL | ELIGIBLE/ INELIGIBLE FLAG | PARTIAL APPROVAL FIELD | APPROVED AMOUNT | ORIGINAL TOTAL AMOUNT |
|---|---|---|---|---|---|---|
| ... | | | | | | |

FIG. 15

AUTO SUBSTANTIATION FOR OVER-THE-COUNTER TRANSACTIONS

CROSS-REFERENCES TO RELATED APPLICATIONS

This application claims the benefit under 35 U.S.C. §119 (e) of the following U.S. patent applications which are hereby incorporated herein by reference in their entirety for all purposes: Application No. 60/641,483, filed Jan. 4, 2005, entitled "Method and System for Determining Healthcare Eligibility"; Application No. 60/641,464, filed Jan. 4, 2005, entitled "Method for Encoding Messages Between Two Devices for Transmission Over Standard Online Payment Networks"; and Application No. 60/641,597, filed Jan. 4, 2005, entitled "Auto Adjudication for Over-the-Counter Transactions".

FIELD OF THE INVENTION

One embodiment of the invention relates generally to financial transactions. More particularly, according to one embodiment of the invention, a method of processing through a payment network the purchase transactions made under a flexible spending account is described.

BACKGROUND

The Internal Revenue Service permits employers to offer tax-advantaged employee benefits relative to healthcare reimbursement, transportation (transit and parking) and dependent care expenses.

Employers may provide employees with dollars for these purposes or permit payroll deductions, up to the limits defined by the IRS. In both cases, the employer is eligible for savings on FICA taxes on these amounts. To be in compliance with IRS requirements, the employer must adopt a program to ensure that these dollars are spent only for the qualified category of goods or services for the particular benefit area. There are several types of such employee benefits accounts, including flexible spending accounts, healthcare reimbursement arrangements and health savings accounts. For convenience of reference, these types of accounts are referred to herein as "flexible spending accounts".

A typical way of documenting and substantiating that the funds are properly spent is to have the employee submit receipts that document the goods or services for reimbursement. However, under this approach, the employee must pay out of their own funds, then, wait to get reimbursed. Additionally, this approach involves considerable manual staff support to receive and review the receipt documentation, then cut checks or arrange for a funds transfer into the employee's checking account.

Recently, payment cards have been added as a means of permitting employees to use a debit, credit or prepaid ("payment") card to directly access the funds account. While this increases the convenience for the employee, it may create instances in which the employee has to be asked to send a copy of the receipt to document that the goods or services purchased with the payment card were, in fact, qualified items for the type of benefit account. To help reduce the administrative expense associated with getting this follow-up receipt documentation, some card issuers place restrictions on the locations where the payment cards can be used. As a result of the account/funds usage restrictions, the card issuer declines transactions at locations that are not clearly identifiable as the qualified type, even though the goods or services being purchased may be qualified products/services. This results in an inconvenience for the cardholder and incurs the cost of manual receipt documentation and funds reimbursement.

SUMMARY

According to one embodiment of the invention, a method of authorizing a payment transaction request through a payment network is described for a product under a flexible spending account of a consumer, wherein the method comprises determining via a computer that a product requested for purchase at a point of sale by the consumer matches a qualified product category under the flexible spending account, and sending an authorization request message for requesting use of the flexible spending account of the consumer, wherein the authorization request message comprises: a total purchase amount field and a first qualified amount field for a first type of qualified item(s) to enable the real-time substantiation of the purchase as constituting qualified items for the type of flexible spending account.

According to another embodiment of the invention, a split tender payment system is disclosed for a first product authorized under a flexible spending account of a consumer and a second product which is not authorized under the flexible spending account wherein the method comprises sending an authorization request message through a payment network for requesting use of the flexible spending account of the consumer for the first product, receiving authorization to pay for the first product with the flexible spending account, determining that the second product is not authorized under the flexible spending account, and processing payment for the second product with an alternative source of payment from the flexible spending account.

According to yet another embodiment of the invention, a method of submitting product information through a payment network for a flexible spending account of a consumer for processing by an auditor of the flexible spending account is disclosed wherein the method comprises conducting a transaction with the consumer for purchase of a product under the flexible spending account, preparing with a computer a transaction record of the conducted purchase, and sending the transaction record to the auditor of the flexible spending account. Use of the word "auditor" is intended to connote someone who reviews or administers a flexible spending account. For example, this could include any company that administers a flexible spending account, including a healthcare insurance company, a third party agent of the employer or the human resources department of an employer, that monitors the use of the flexible spending account purchases, or the US Internal Revenue Service that audits the purchases made under a flexible spending account.

BRIEF DESCRIPTION OF THE DRAWINGS

FIG. 7 illustrates an authorization request according to one embodiment of the invention.

FIG. 8 illustrates an alternative authorization request according to one embodiment of the invention.

FIG. 9 illustrates an authorization request according to yet another embodiment of the invention.

FIG. 13 illustrates a standard settlement record and transaction record according to one embodiment of the invention.

FIG. 14 illustrates a more detailed view of the transaction record portion of FIG. 13 according to one embodiment of the invention.

FIG. 15 illustrates an authorization response message according to one embodiment of the invention.

DESCRIPTION

Figure 1:
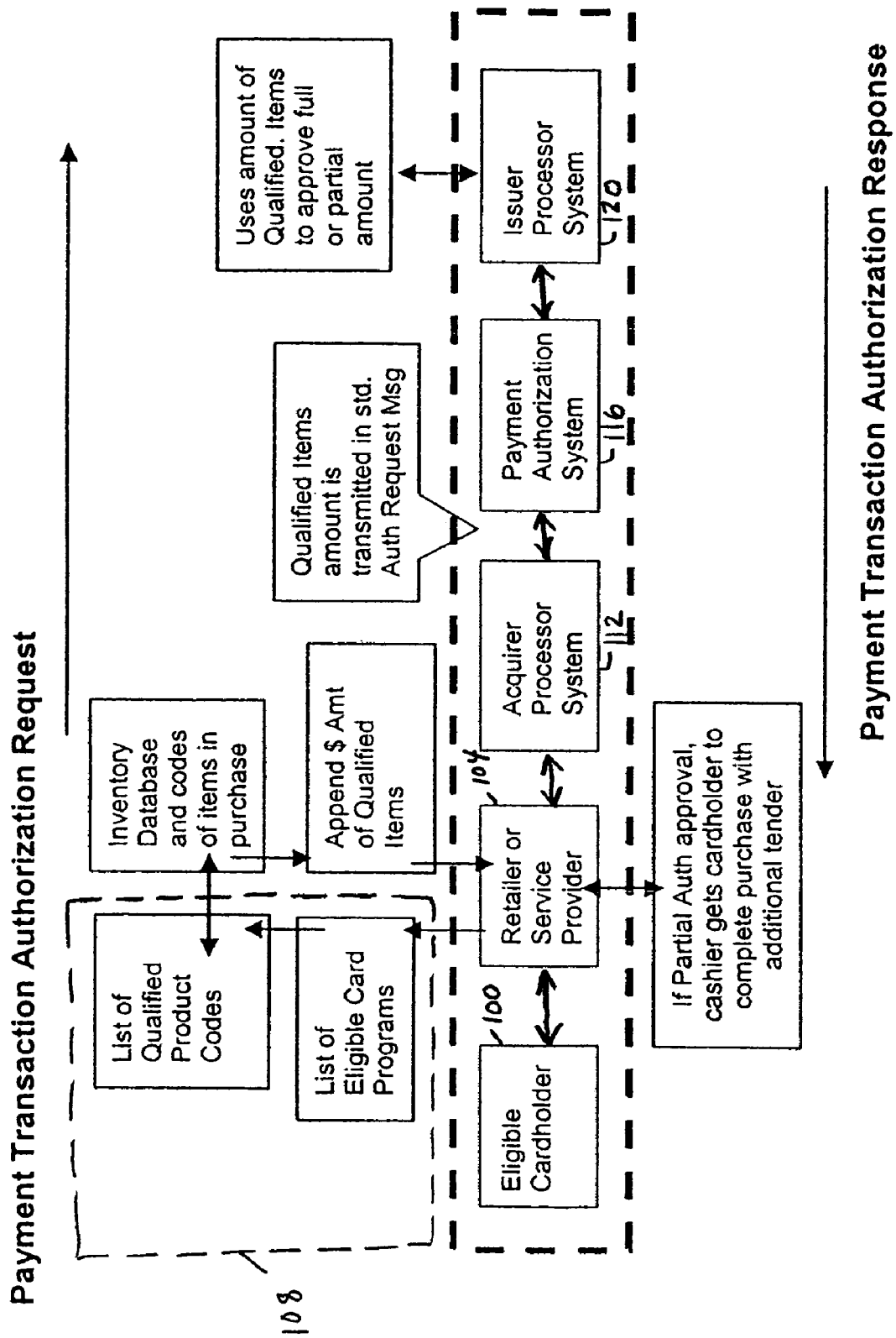
FIG. 1 illustrates a flow diagram of a payment transaction authorization system according to one embodiment of the invention.

Referring now to FIG. 1, a flow diagram is shown that illustrates a method of implementing a payment transaction authorization request and payment transaction authorization response for a flexible spending account. A flexible spending account is intended to encompass employee benefit accounts sanctioned by government authorities, such as the Internal Revenue Service in the United States, that offer tax advantaged employee benefits. Examples of flexible spending accounts include those that cover healthcare expenses, transportation (transit and/or parking) expenses, and dependent care expenses. Health savings accounts (HSA's) and healthcare reimbursement arrangements (HRA's) are other examples of tax advantaged employee benefit accounts that are referred to herein as flexible spending accounts for the sake of convenience.

FIG. 1 shows a system that can be used for processing transactions that are initiated, for example, at a retailer or service provider. There are many consumers that do not presently use their flexible spending accounts at retailers or service providers in an over-the-counter fashion because the current systems are not configured to process such transactions. Thus, many items cannot easily be purchased under the flexible spending accounts without undergoing the timely process of submitting receipts and additional paperwork to verify that the purchase was made and was made for an item that was qualified under the flexible spending account. Therefore, FIG. 1 illustrates a system that provides an auto substantiation function by determining whether a qualified product under a flexible spending account is being purchased and thus is entitled to be purchased with a flexible spending account card, for example.

FIG. 1 shows an eligible card holder 100 presenting an item for purchase at a retailer or service provider 104. The retailer's electronic cash register system can support a list of qualified products, for example a list of qualified product codes that are stored on an electronic cash register. This list of qualified product codes establishes a list of qualified product categories that are eligible for card usage. Additionally, the electronic cash register can support a list of identifying card programs. For example, the first six digits of the flexible spending account card number can be utilized to identify the account as being a flexible spending account that is eligible for purchase of goods or services from that particular merchant. Thus, FIG. 1 illustrates the electronic cash register 108 as storing the list of codes and eligible card programs. An electronic cash register system is a term used to describe both integrated systems where terminal functionality is built within the cash register itself as well as systems where the POS terminal is a stand-alone device that interacts with the electronic cash register.

When the card holder presents an eligible payment card, the retailer can match the card number with the list of eligible card programs. Upon identifying an eligible card program, the retailer's electronic cash register system can evaluate the product inventory code in the checkout basket against the list of qualified product categories. It should be understood that a payment card is a portable consumer device. Examples of portable consumer devices include credit cards, debit cards, prepaid cards, healthcare insurance cards, smart cards (integrated circuit chip cards), contactless chip cards (using radio frequency identification), driver's licenses, personal digital assistants, ATM cards, security badges, access badges, stored value cards, biometric identification cards, pagers, and the like. Interaction between a retailer's electronic cash register system or POS terminals and the portable consumer device can be facilitated using any suitable optical, magnetic, electromagnetic, or electronic mechanism. In some embodiments, the portable consumer device is in the form of a card and has a magnetic stripe.

Upon determining that the product code of the item presented for purchase matches one of the qualified product codes in the list accessible from the electronic cash register and that the flexible spending account identifier provided by the card holder matches one of the eligible card programs in the list of eligible card programs that is accessible from the electronic cash register, an authorization request message is formatted by the retailer 104. This authorization request message is sent to the retailer's acquirer processor system 112 in FIG. 1. Furthermore, FIG. 1 shows that the acquirer processor system forwards the authorization request message to the payment authorization system 116 which in turn forwards the authorization request message to the issuer processor system 120. The issuer processor system 120 or a third party can review the authorization request message so as to determine whether the purchase is authorized under the flexible spending account. This can be accomplished by reviewing the product amount or by reviewing a product code and product amount submitted as part of the authorization request message.

Once the determination is made by the issuer or its associated third party (such as a third party administrator or end user client of the issuer), a payment transaction authorization response message can be formatted. This is returned to the retailer or service provider. One alternative is for partial authorization to be granted for the product under the flexible spending account while denying authorization for the balance of the purchase amount. In that situation, the retailer can request additional payment means from the cardholder. Thus, a purchase of an authorized product can be made with the flexible spending account while cash, check, or other payment card is used to pay for non-authorized products.

Figure 2:
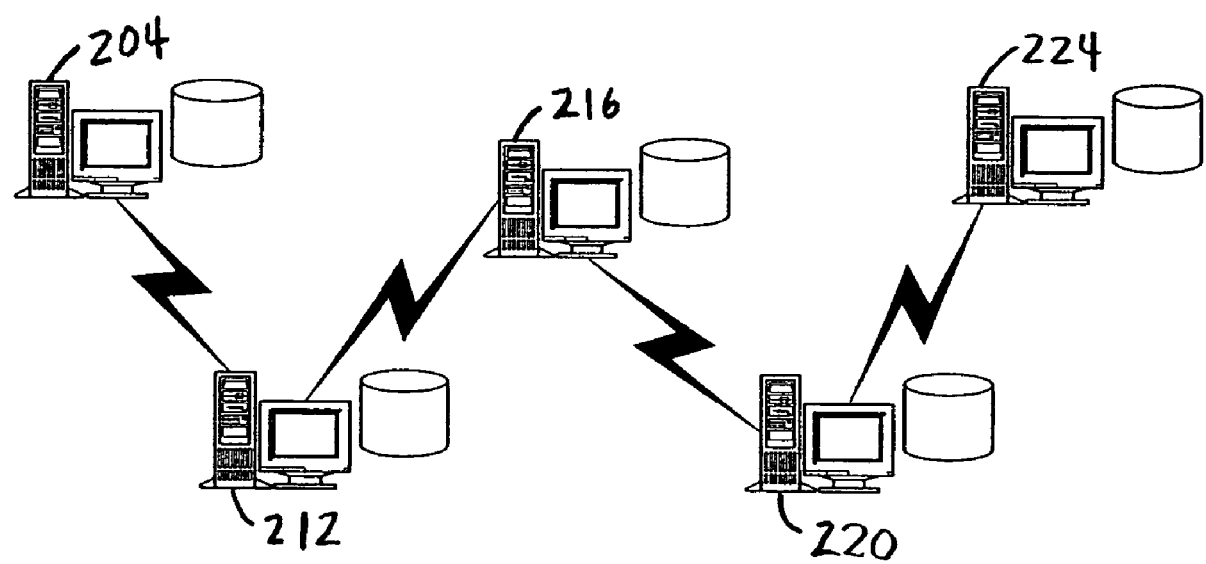
FIG. 2 illustrates a computer network operable to implement an authorization and settlement process according to one embodiment of the invention.

FIG. 2 illustrates a system for implementing the transaction system shown in FIG. 1. Namely, FIG. 2 illustrates a merchant computer system 204 which is in communication with an acquirer computer system 212. The acquirer computer system in turn is in communication with the payment authorization system 216. For example, under the Visa system, the VisaNet system can be utilized to implement the payment authorization system. The payment authorization system 216 is in communication with the issuer of the flexible spending account. While the issuer system itself may process the authorization transactions, the issuer system 220 shown in FIG. 2 may also communicate with a third party administrator of the flexible spending account. This could be a third party which performs the processing of transactions for the issuer. Alternatively, it could be the client of the issuer, such as a health insurance company implementing a health reimbursement arrangement or a health savings account.

Figure 3:
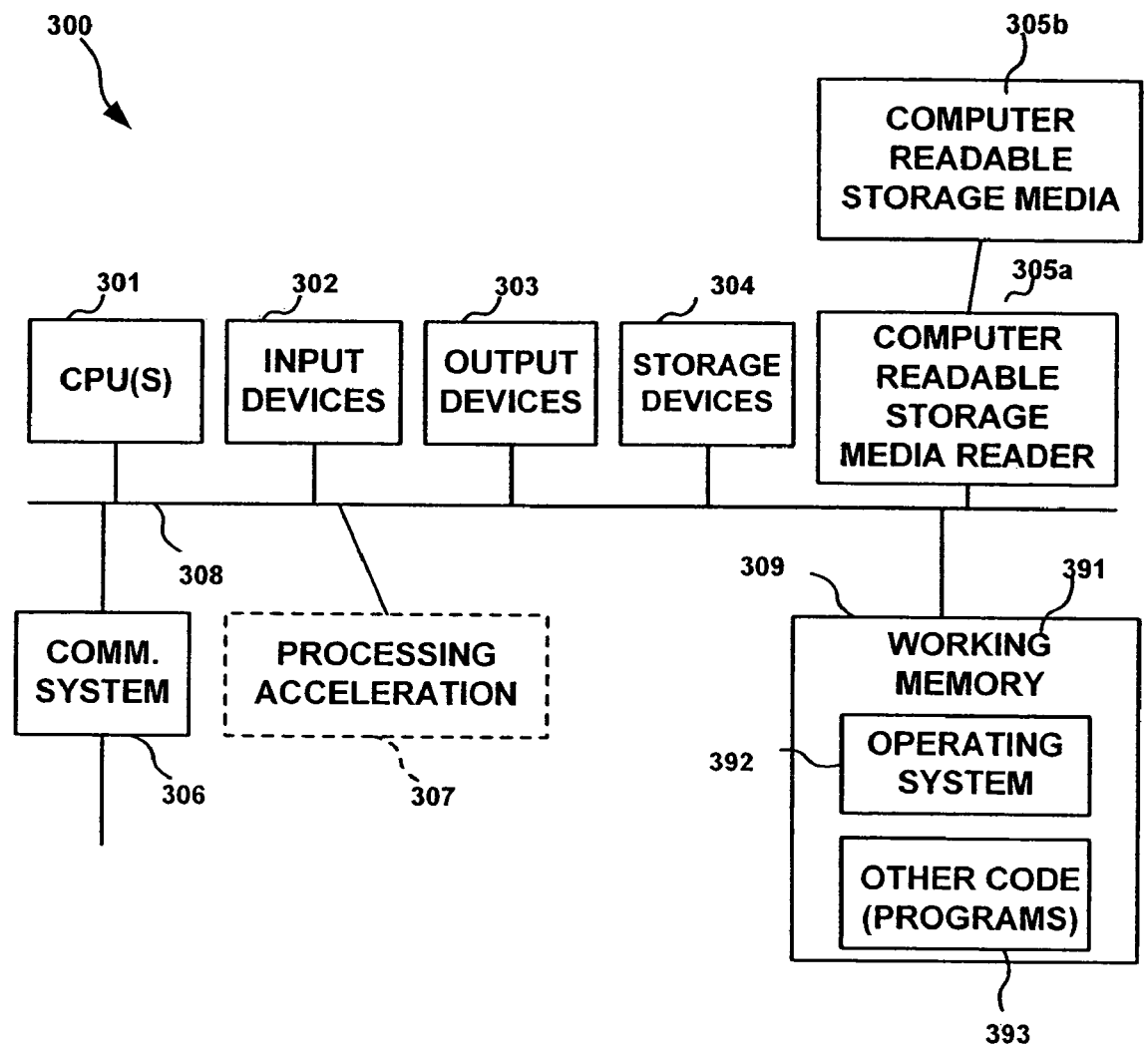
FIG. 3 illustrates a block diagram of a computerized device such as those used in FIG. 2.

FIG. 3 illustrates a block diagram of a computing device which can be implemented to accomplish the computer system shown in FIG. 2. For example, FIG. 3 broadly illustrates how individual system elements can be implemented. System 300 is shown comprised of hardware elements that are electrically coupled via bus 308, including a processor 301, input device 302, output device 303, storage device 304, computer-readable storage media reader 305a, communications system 306, processing acceleration (e.g., DSP or special-purpose processors) 307 and memory 309. Computer-readable storage media reader 305a is further coupled to computer-readable storage media 305b, the combination comprehensively representing remote, local, fixed and/or removable storage devices plus storage media, memory, etc. for temporarily and/or more permanently containing computer-readable information, which can include storage device 304, memory 309 and/or any other such accessible system 300 resource. System 300 also comprises software elements (shown as being currently located within working memory 391 including an operating system 392 and other code 393, such as programs, applets, data and the like.

System 300 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 300 component (e.g. within communications system 306). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 300 components will necessarily be required in all cases.

Figure 4:
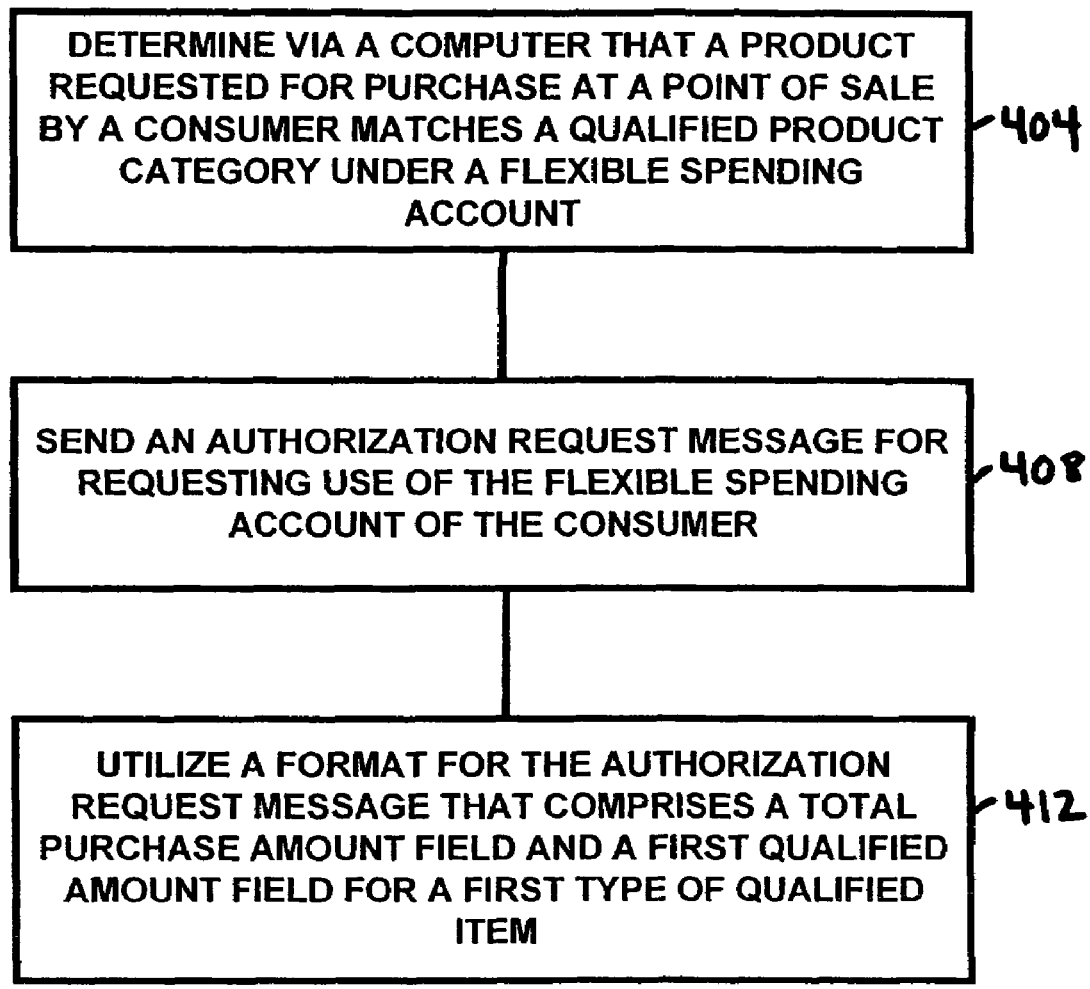
FIG. 4 illustrates a flow chart demonstrating a method of implementing an authorization request according to one embodiment of the invention.

Referring now to FIG. 4, a flow chart 400 illustrates a method of conducting the authorization transaction according to one embodiment of the invention is shown. In block 404, a determination is made via a computer that a product requested for purchase at a point of sale by a consumer matches a qualified product category under a flexible spending account. It should be understood that use of the word "product" is intended to mean not only goods, but also services. In block 408, an authorization request message is sent for requesting use of the flexible spending account of the consumer. In block 412 a format for the authorization request message is utilized that comprises a total purchase amount field, as well as a first qualified amount field for a first type of qualified item(s). This amount field can include the total purchase price for one or more qualified items. A more detailed method according to one embodiment of the invention can be seen in FIGS. 5A, 5B, and 5C.

Figure 5A:
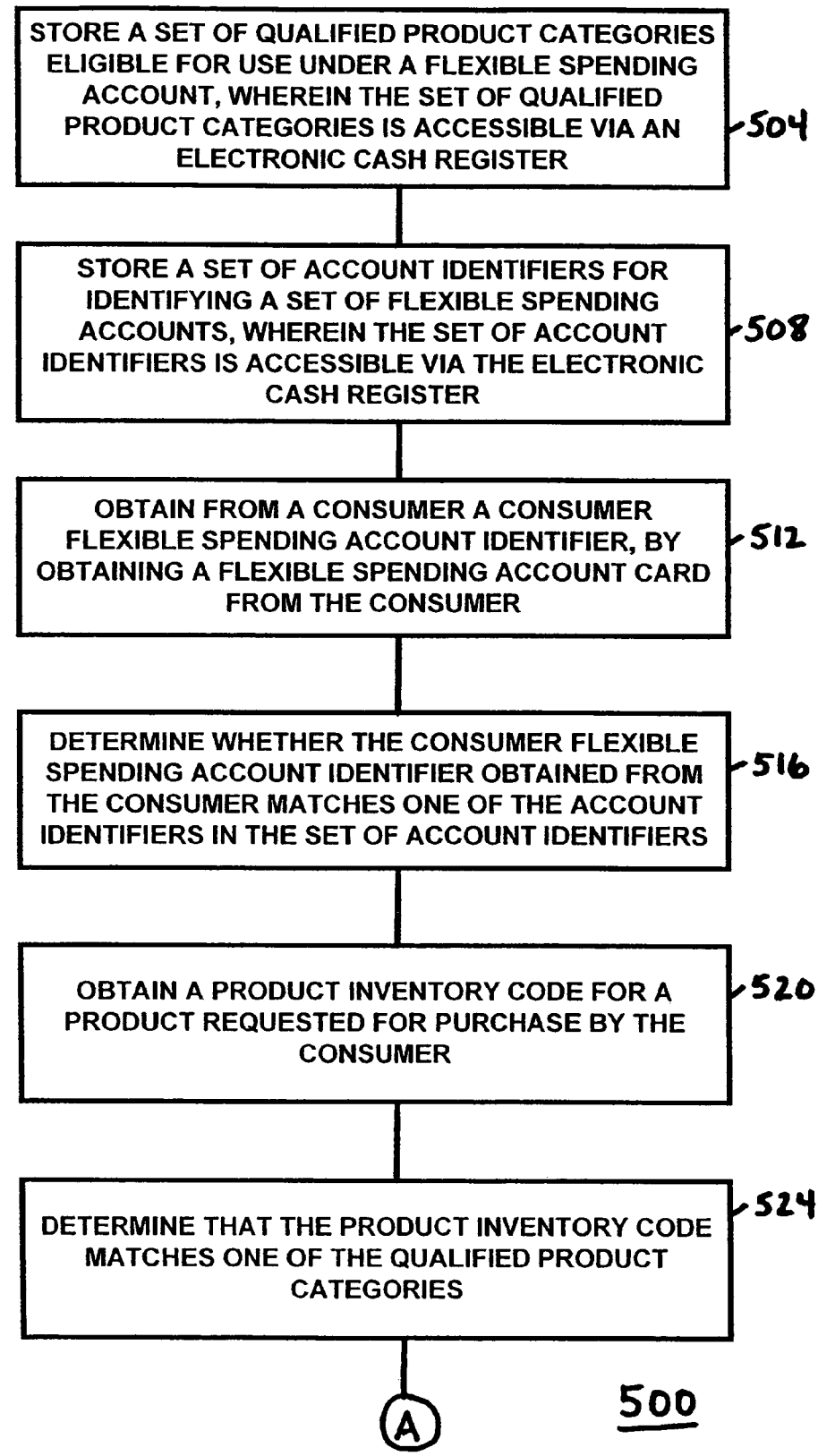
FIGS. 5A, 5B and 5C illustrate a flow chart demonstrating a method of implementing an authorization request according to one embodiment of the invention.
Figure 5B:
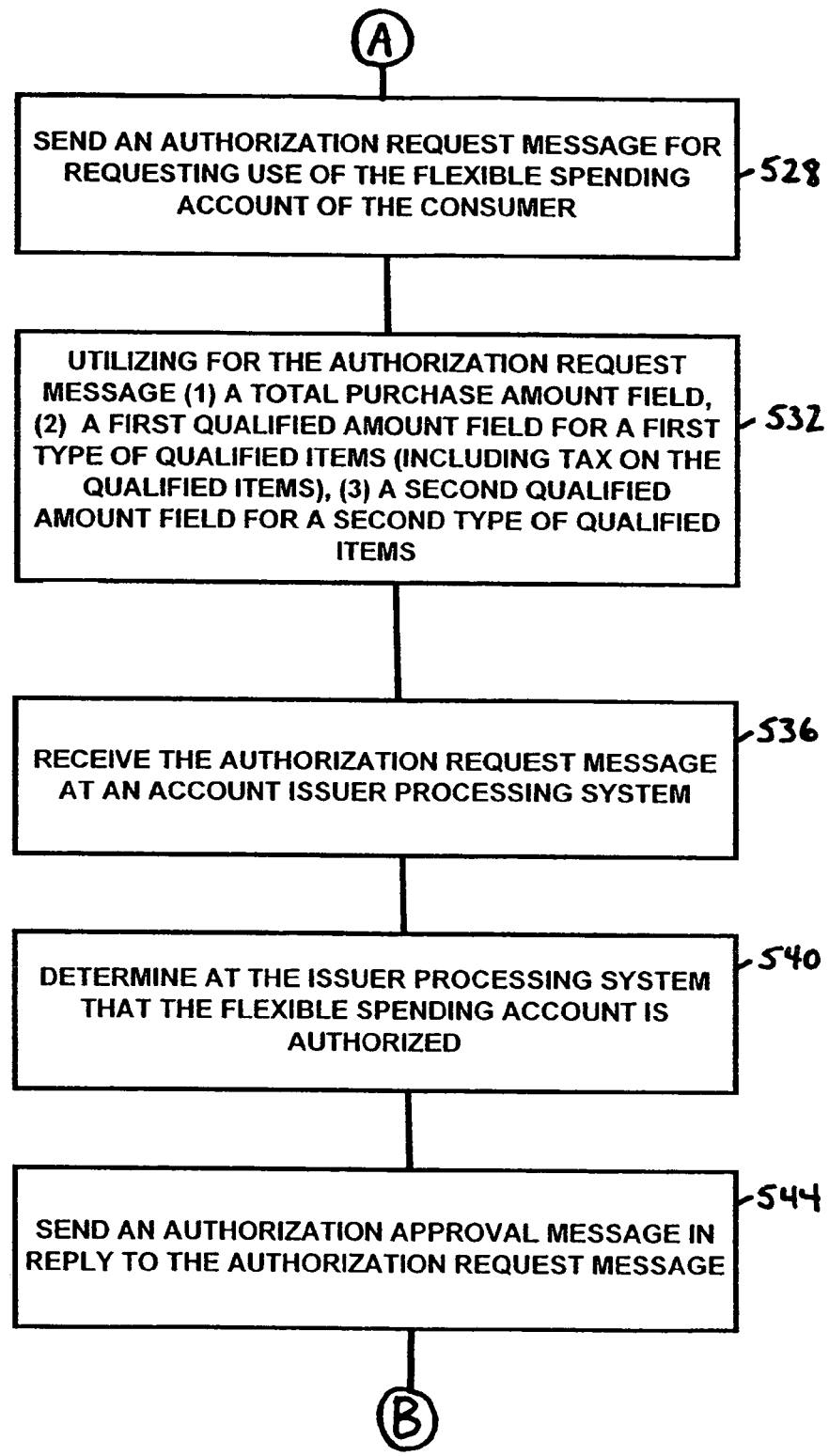
Figure 5C:
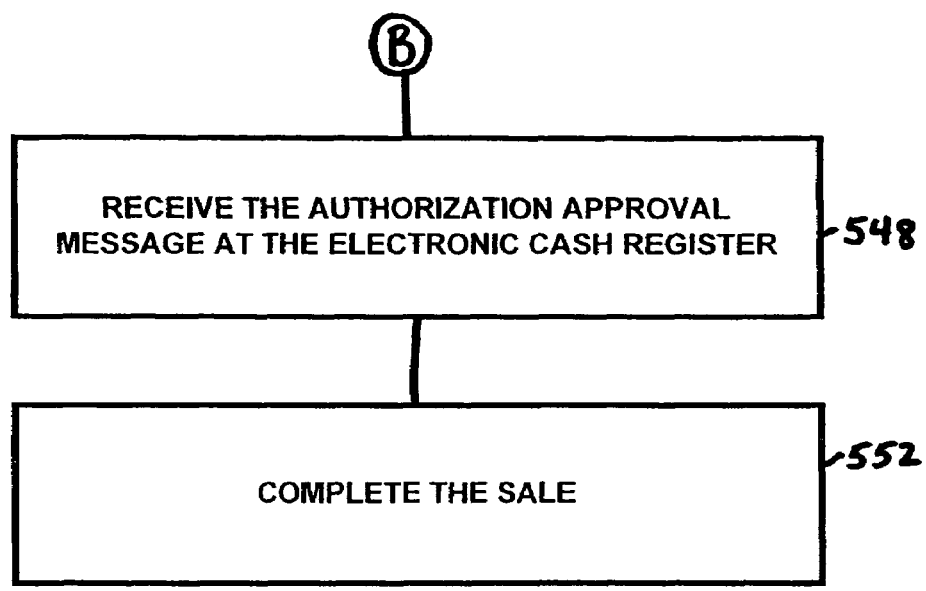

FIGS. 5A, 5B, and 5C illustrate a flowchart that demonstrates a method of conducting a transaction according to the system shown in FIG. 1. In block 504, a set of qualified product categories eligible for use under a flexible spending account are stored. For example, these can be stored in the memory of an electronic cash register or in a data storage device which is accessible by the merchant utilizing the electronic cash register. Thus, it is not required that the qualified product categories be stored at the electronic cash register or merchant processing device as long as they are accessible to the merchant. In block 508 a set of account identifiers for identifying a set of flexible spending accounts is stored. Again, these can be stored at the electronic cash register or at a different storage location.

In block 512 the consumer presents the consumer flexible spending account identifier for use in the purchase. For example, the merchant can obtain the consumer's flexible spending account identifier from a payment card presented by the consumer. Alternatively, other types of devices can be utilized to obtain the identifier for the flexible spending account as would be understood by those of ordinary skill in the art. In block 516 a determination is made as to whether the consumer's flexible spending account identifier matches one of the account identifiers in the list accessible from the electronic cash register. The list of valid account identifiers can include not only the consumer's flexible spending account identifier, but also those identifiers used for other plans. One way to implement this is by utilizing the first six digits of an account identifier for purposes of identifying all the flexible spending accounts associated with a certain plan. Thus, for example, the bank identification numbers (BIN) utilized by Visa on its payment cards can be grouped via the first six numbers of those bank identification numbers to indicate participation in a particular flexible spending account program. Individuals participating in a particular flexible spending account plan can be identified particularly by the remaining numbers in the bank identification number. This provides an easy and efficient way to identify a flexible spending account card without requiring storage of all flexible spending account bank identification numbers at the electronic cash register. Additional flexible spending account programs accepted by the merchant can be recognized by the first six digits of their respective BIN numbers, as well.

In block 520 a product inventory code is obtained for a product requested for purchase by the consumer. For example, the Stock Keeping Unit (SKU) for a product can be obtained by scanning the barcode from a particular product or entering the SKU for a particular service being purchased from the merchant. In block 524 a determination is made as to whether the product inventory code matches one of the qualified product categories. By utilizing SKU codes, a simple table look-up can be implemented to determine whether the SKU for a particular product matches one of the product inventory codes stored at the electronic cash register or accessed via the electronic cash register.

If the product matches a qualified product category and the card identifier matches a valid account identifier, a payment network authorization request message can be sent with additional information regarding the amount of the qualified items included in the authorization request. In block 528 an authorization request message is sent requesting use of the flexible spending account payment card of the consumer. The authorization request message can be formatted in a variety of ways. For example, FIGS. 7, 8, and 9 illustrate alternative ways of formatting an authorization request for a product being purchased with a flexible spending account. One example is that shown in block 532 which involves utilizing for the authorization request message the following fields: total purchase amount field; first qualified amount field for a first type of qualified item(s) (including tax on the qualified item(s)); second qualified amount field for a second type of qualified item(s). This format allows an authorization request to be made for a purchase of products that fall into different categories. For example, this could include a first product that falls into the transit reimbursement category and a second product that falls into the health care category. This format is shown in more detail in FIG. 8.

FIG. 8 illustrates that the standard authorization request message can be formatted with normal fields including the total amount of purchase as well as additional fields for the total amount for the first type of qualified product and the total amount for the second type of qualified product. FIGS. 7 and 9 show alternative embodiments of formatting an authorization request message.

FIG. 7 illustrates that a standard authorization request message 704 can have appended to it a field 708 for the total amount of qualified product items that is being submitted as part of the authorization request. Thus, FIG. 7 illustrates an authorization request message that would be implemented based upon price. By virtue of the electronic cash register determining that the product(s) was a qualified product from the list of qualified products, the initial eligibility test would have been implemented by the electronic cash register.

Alternatively, FIG. 9 illustrates an authorization request message that includes product information. Thus, FIG. 9 shows a standard authorization request message having the total amount of purchase field, as well as appended fields for the product code, sales amount, and tax amount. This information could be forwarded to the issuer or third party administrator working on behalf of the issuer, or the client of the issuer to determine whether the submitted product and the amount of the submitted product qualified under the flexible spending account for authorization.

Referring again to FIG. 5B, block 536 shows that the authorization request message is received at an account issuer processing system. Thus, for example, the authorization request message can be sent via the acquirer of the merchant and the transaction processing system to the issuer. In block 540 a determination is made as to whether the flexible spending account transaction is authorized. The determination can be made by the issuer of the flexible spending account. Alternatively, a third party, such as a processor or third party administrator who works for the issuer can be tasked with the job of determining whether the submitted authorization request qualifies under the flexible spending account guidelines. Furthermore, the client of the issuer, such as an insurance company, can perform the task as well. Also, a determination can be made, by the issuer, for example, as to whether the flexible spending account contains a sufficient funds to pay for the product.

Once a determination is made in regard to the authorization request, an authorization approval message can be formatted to reply to the authorization request message as shown in block 544. In block 548, the authorization approval message is received at the merchant, such as at the electronic cash register of the merchant, at which point the sale can be completed as shown in block 552.

The authorization approval message can be formatted according to FIG. 15. FIG. 15 shows a standard payment network authorization approval message with additional appended fields. Namely, a product code field for identifying the product submitted for authorization is shown. Also, a line item total for the particular product is shown. Furthermore, a flag indicating whether the product category was eligible or ineligible is shown. In addition, a partial approval field can be utilized to indicate whether total approval is given for use of the flexible spending account being utilized to fund the transaction or whether only partial approval is given for the particular product being submitted. In addition, a field indicating the approved amount can be used. Also, the original total amount of the transaction can be appended as well.

Figure 6:
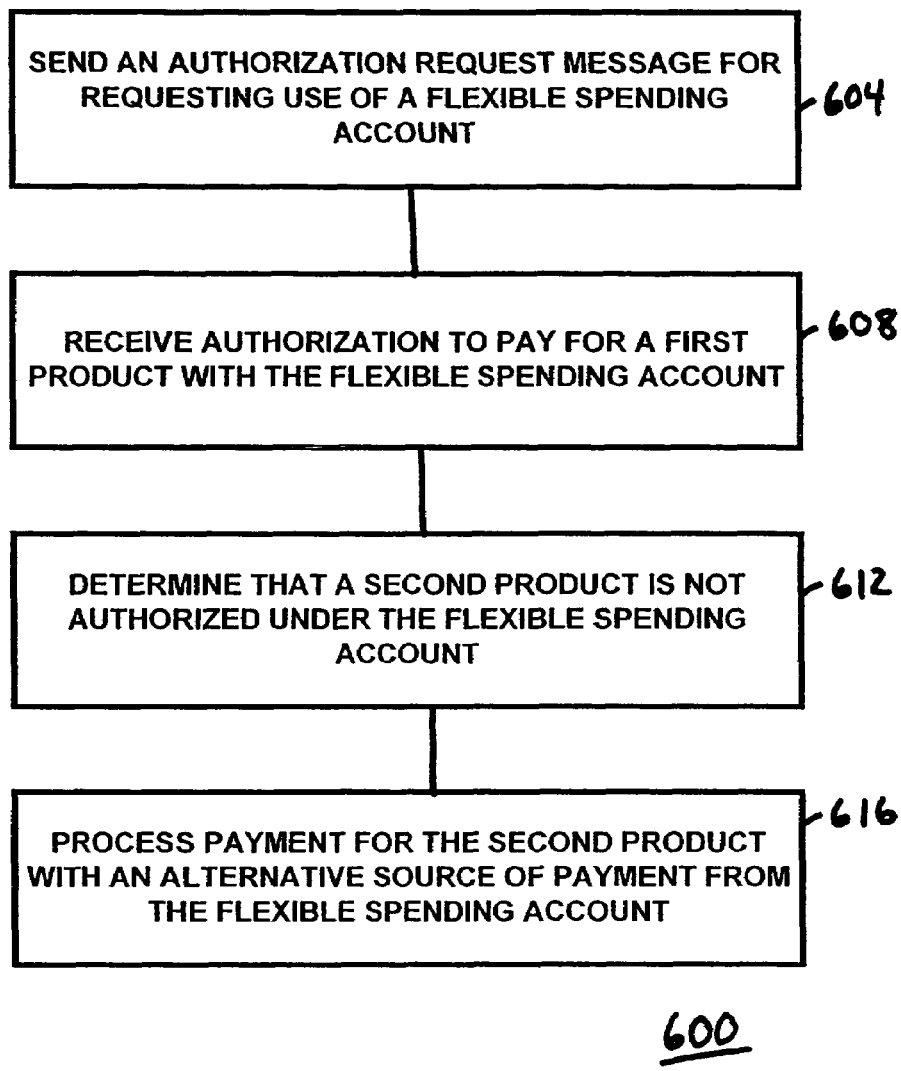
FIG. 6 illustrates a flow chart demonstrating a method of implementing a split tender according to one embodiment of the invention.

As noted in FIG. 15, partial approval can be given through the authorization response. This is beneficial in that it allows a transaction to be implemented for the entire purchase amount using the flexible spending account and then allows a split tender transaction to be implemented for the balance of the transaction amount that was not authorized in the authorization response. Thus, FIG. 6 illustrates a flow chart demonstrating a method of implementing such a split tender transaction. Namely, in block 604, the authorization request message is sent requesting use of the flexible spending account. In block 608, authorization is received to pay for a first product with the flexible spending account. Thus, this would be a product that satisfied the regulations of the flexible spending account and was considered an approved product under the guidelines of that particular flexible spending account. In block 612 a determination is made that a second product submitted as part of the same purchase transaction is not authorized under the flexible spending account. Thus, for example, if the consumer is also purchasing a transit pass, that would not satisfy the requirements of the flexible spending account. As a result, the authorization response message returned by the issuer would indicate that the entire transaction purchase amount was not authorized. Rather, only the price of the first product would be authorized. In block 616, a split tender payment process can be implemented by paying for the second product with an alternative source of payment other than the flexible spending account. Thus, the consumer could present another payment card as well as cash or check for completing the purchase transaction. This provides a benefit in that it allows the consumer to utilize his or her flexible spending account payment card and then complete the remainder of the purchase with an alternative form of payment. Further, the method supports an issuer authorization of a partial amount of the qualified total if the cardholder does not have a sufficient available balance to approve the full qualified total amount. This provides the benefit of permitting the cardholder to complete the purchase with spilt tender, using cash, checks or another payment card.

Once an authorization request message has been submitted and an authorization approval message has been received, the transaction still needs to be settled. Thus, a settlement function is typically implemented by a batch process by a merchant in submitting all the transactions for all payments accepted periodically, such as at the end of the day. For example, merchant ABC may submit all the records of the transactions that were made by sending a batch message to the merchant's acquiring bank at the end of the day. The merchant's acquiring bank would then submit all authorized transactions to the respective payment network. Thus, this provides a unique vehicle for forwarding transaction information for use in auditing the transactions made with a flexible spending account.

Figure 10:
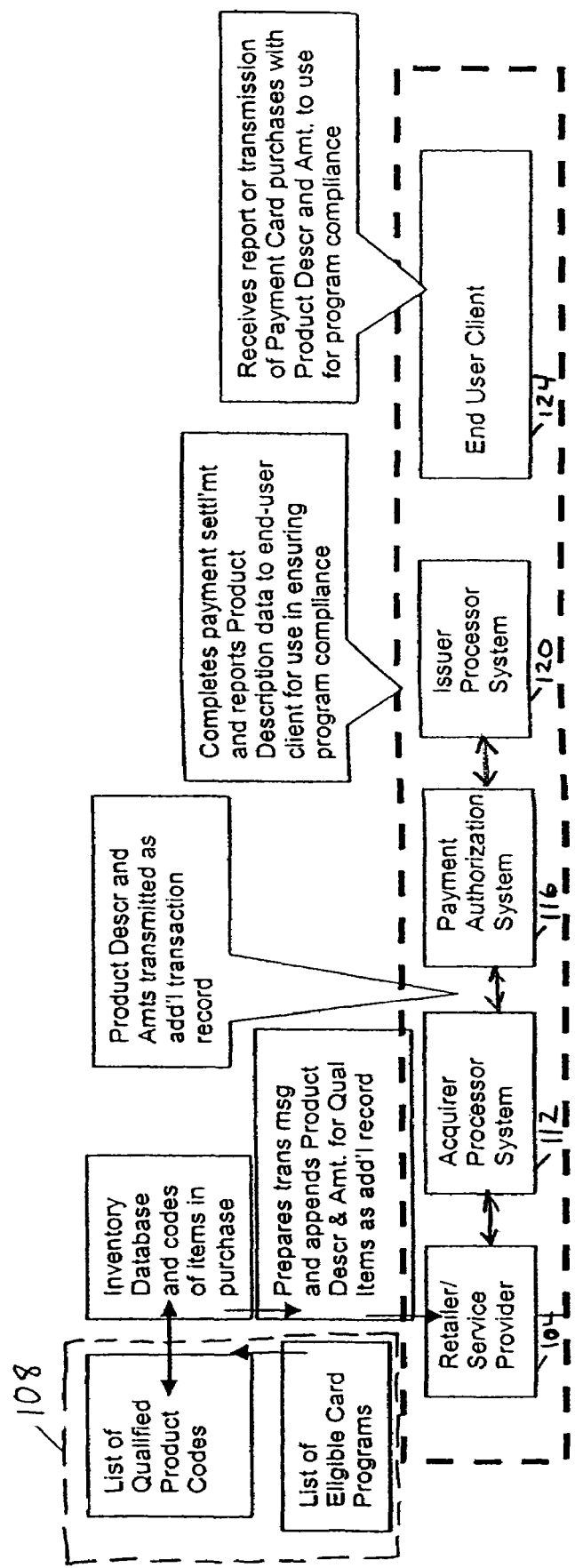
FIG. 10 illustrates a flow diagram for implementing an auditing process for program compliance according to one embodiment of the invention.

Referring now to FIG. 10, a flow diagram illustrating a method of confirming program compliance is shown. A payment network settlement transaction can be utilized according to one embodiment of the invention to include additional data that provides an issuer or end user client with information about particular products that were purchased under the flexible spending account. Thus, FIG. 10 illustrates how a merchant can format a batch process to send to its acquiring bank about all the transactions that were made under flexible spending accounts administered by participating issuers or end user clients. Furthermore, FIG. 10 illustrates that the payment network settlement process can be utilized to send information to the issuer or end-user client about particular flexible spending account transactions that were made so as to allow the issuer or end user client to confirm that a transaction that was approved by amount, for example, was actually a product authorized under the flexible spending account.

FIG. 10 shows that a standard settlement record can be appended with product description and amount information for qualified items purchased under the flexible spending account. This can be formatted by the retailer 104 as part of the settlement transaction process. The retailer can forward the standard payment network settlement record and the additional information record about the flexible spending account transactions (referred to herein as the transaction records) to the acquirer processor system 112 which in turn, forwards it to the payment authorization system 116. The standard payment network settlement record and the appended transaction record can then be forwarded to the issuer processor system 120. At this point the standard payment network settlement record can be utilized by the issuer as part of the settlement process and the transaction record can be separately used by the issuer or forwarded to a third party administrator or end user client. The transaction record can be utilized, for example, by the end user client to check program compliance. As noted earlier, one method of implementing the authorization request is for the merchant to perform a check as to whether a particular product is eligible under the flexible spending account by comparing the product code of the product with a list of product codes accessible via the electronic cash register. The issuer then approves the amount of the purchase. Thus, the authorization request system according to this embodiment is dependent upon the check made by the electronic cash register. The compliance system shown in FIG. 10 allows a program compliance check to be made by the end user client by retrieving additional information, such as product code and description to confirm that a particular product is a qualified product under the guidelines of the flexible spending account. It is noted that receiving qualified product amounts in payment network authorization messages may be used on a stand-alone basis or in conjunction with receiving product line item detail transaction records in payment network settlement records, and vice versa.

Figure 11:
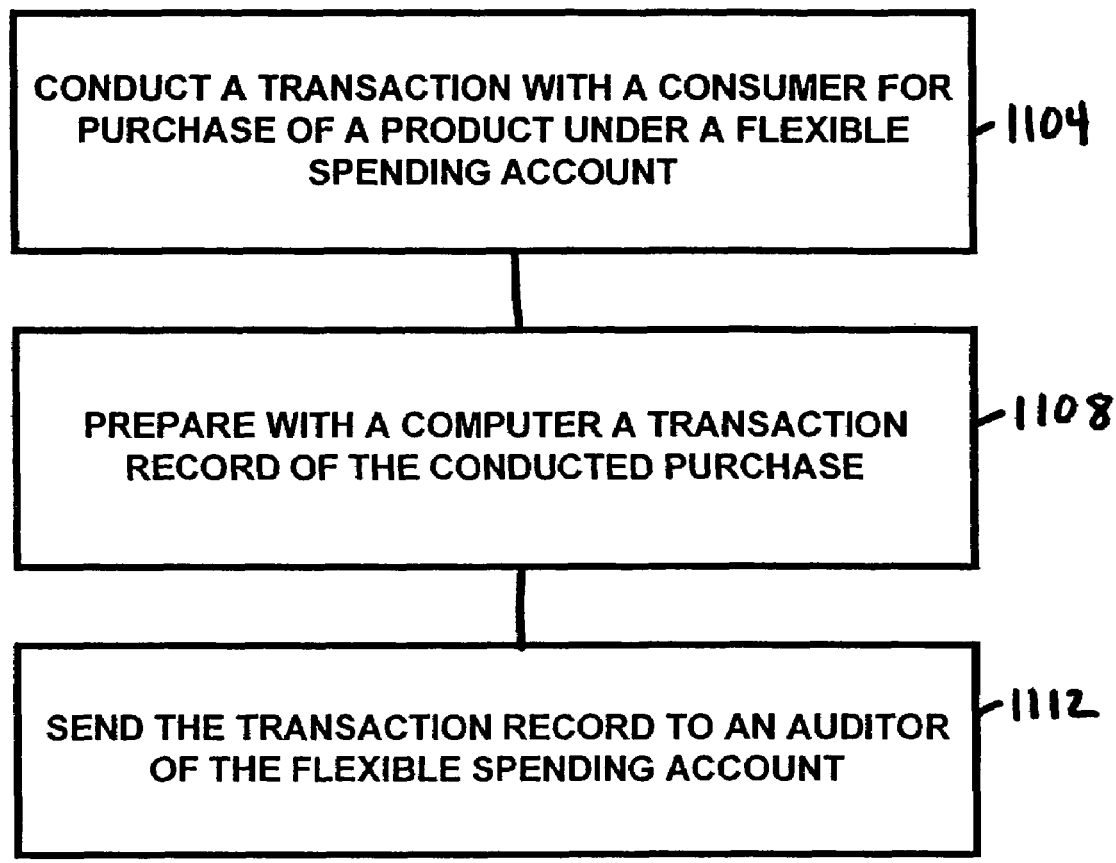
FIG. 11 illustrates a flow chart demonstrating a method of auditing a flexible spending account according to one embodiment of the invention.

FIG. 11 illustrates a flow chart demonstrating a method of implementing the compliance procedure according to one embodiment of the invention. In flow chart 1100, block 1104 illustrates that a transaction with a consumer can be conducted for purchase of a product with a flexible spending account. A computer transaction record of the conducted purchase can be prepared in block 1108. Then, the transaction record can be sent to an auditor of the flexible spending account in block 1112.

Figure 12A:
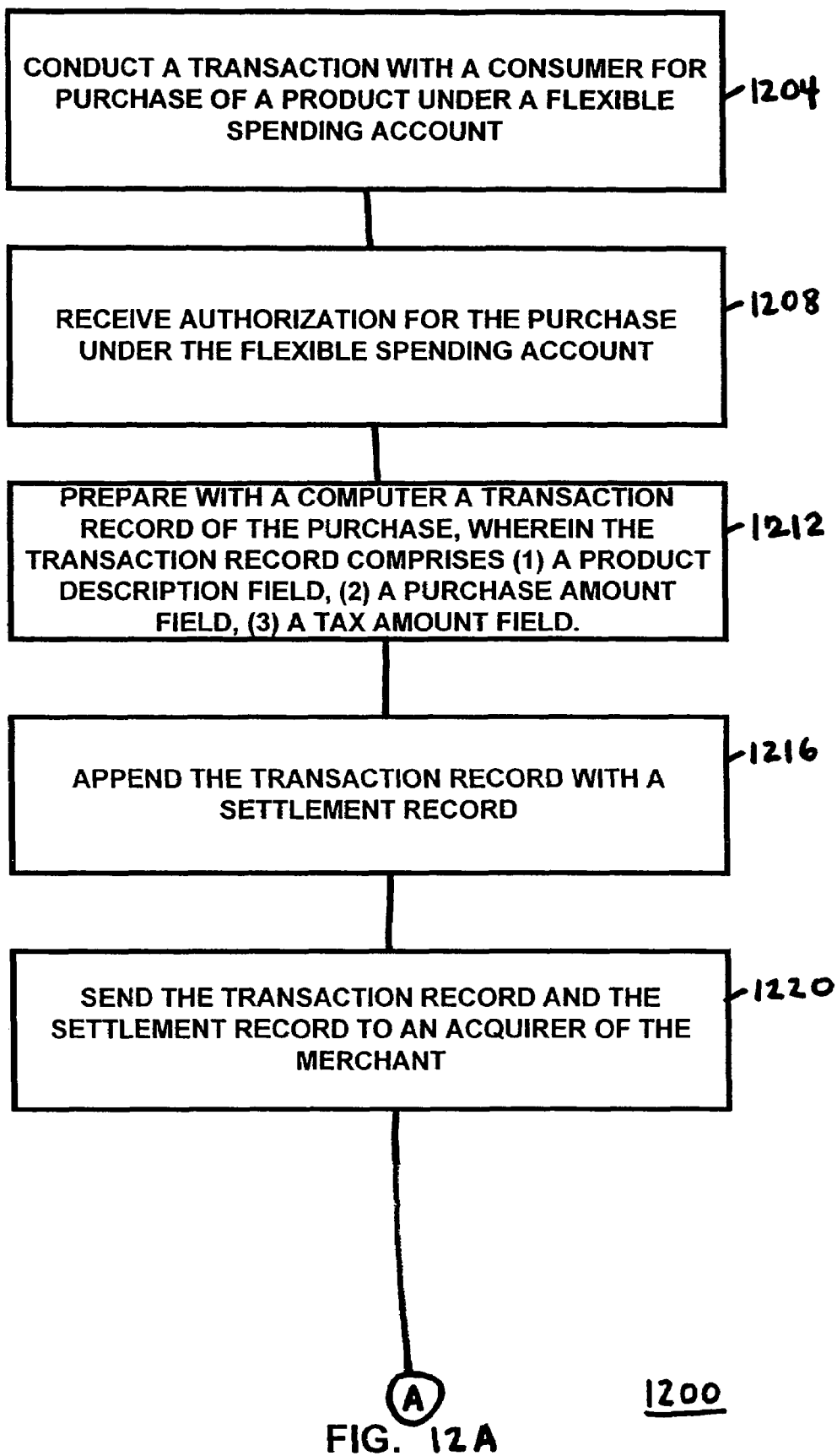
FIGS. 12A and 12B illustrate a flow chart demonstrating a method of providing transaction data according to one embodiment of the invention.
Figure 12B:
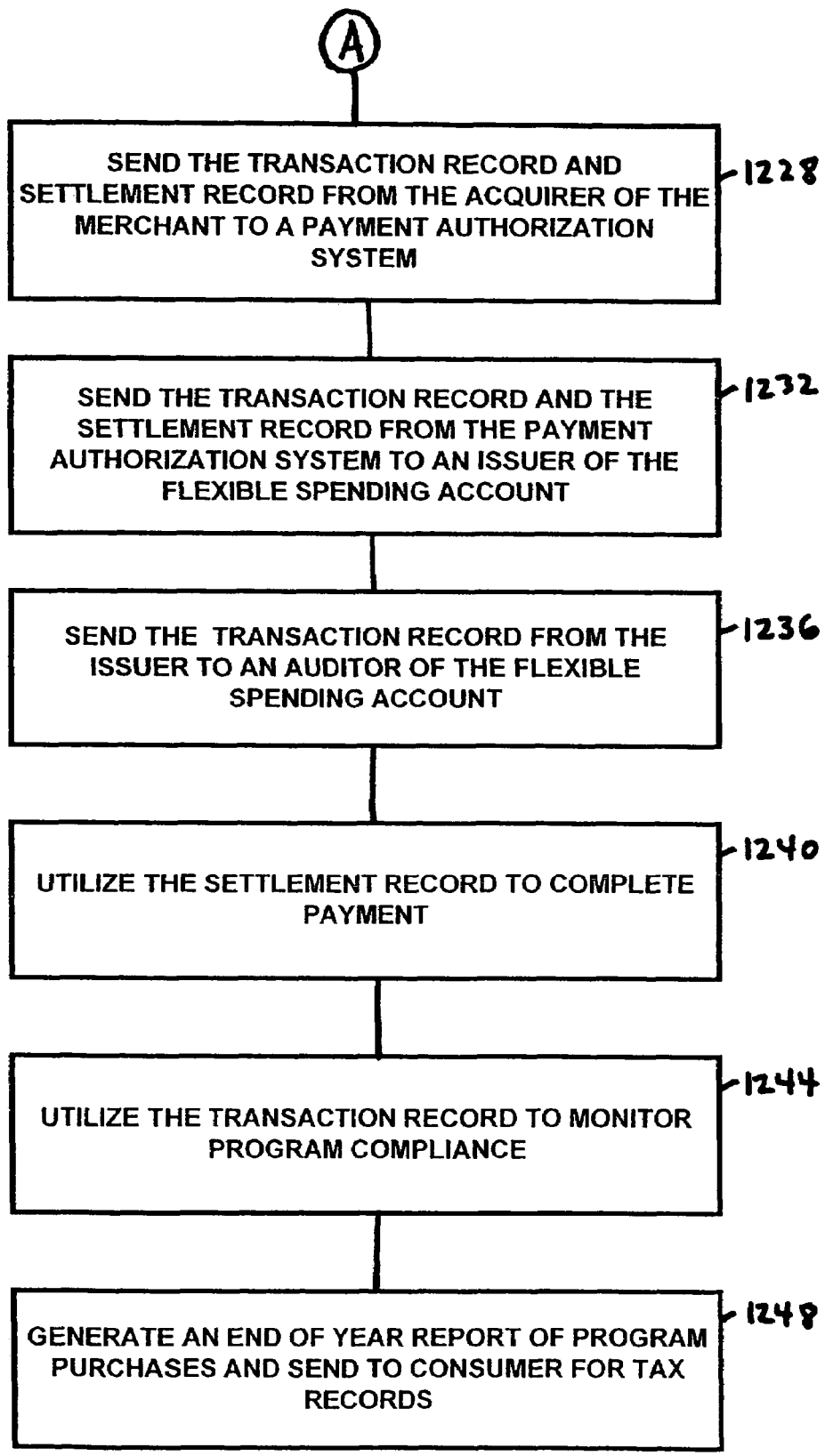

FIGS. 12A and 12B illustrate a flow chart 1200 which demonstrates a method according to a more detailed embodiment of the invention. In block 1204 a transaction with a consumer is conducted for purchase of a product using a consumer's flexible spending account. An authorization request is submitted and authorization is received for the purchase with the flexible spending account as shown in block 1208. A computer transaction record can then be prepared for the purchase. For example, one example of a transaction record would comprise a product description field, a purchase amount field, and a tax amount for the purchase amount as shown in block 1212. This can be seen in more detail in FIGS. 13 and 14.

FIG. 13 shows that a payment network settlement record can be appended with additional information about a flexible spending account purchase, wherein that information is referred to as a transaction record. FIG. 14 illustrates a more detailed view of the transaction record shown in FIG. 13. Namely, FIG. 14 shows that a product code field can be entered as part of the transaction record. In addition, the quantity of products can be included as an additional field. Also, an item descriptor providing additional information about the product can be included as a field. Also, a line item amount can be included to indicate the amount for the item. Similarly, a tax field can be included to indicate the tax for the item. Furthermore, the line item total for the product can be included as a field. Similarly, a product category field can be included. All of this information, or only part of it, can be utilized for the transaction record.

In block 1216 the transaction record is appended to the payment network settlement record as was noted in FIG. 13. The transaction record and the settlement record can then be sent to an acquirer of the merchant as shown on block 1220 and forwarded to the payment authorization system as shown in block 1228. Furthermore, the transaction record and settlement record can be forwarded by the payment network system to the issuer of the flexible spending account as shown in block 1232. At this point, the transaction record can be sent to an auditor of the flexible spending account as shown in block 1236. Alternatively, the issuer may be configured to process the transaction record itself. Thus, for example, an issuer may determine whether a transaction record for a health care account was properly considered a qualified transaction. If the issuer does not perform the compliance process, it may forward the transaction record to a third party processor or an end user client. Thus, for example, the third party processor may be tasked with the job of determining whether a transaction was properly qualified according to the guidelines of a flexible spending account. Similarly, the end user may be configured to perform the compliance process itself.

Block 1240 shows that the payment network settlement record is utilized to complete payment on the transaction as would normally be conducted by an issuer.

One of the benefits of the forwarding of the transaction information through a payment network settlement record to the issuer or end user client is that a statement can be compiled for forwarding to the consumer that indicates all the transactions that were made under the flexible spending account. Additionally, transaction records forwarded by multiple merchants can be delivered to the issuer or end user client using the same format and delivery method. This can be of assistance to the consumer for purposes of reporting on the consumer's taxes as shown in block 1248.

A benefit of one embodiment of the invention is that these processes can serve as a standard that multiple retailers, issuers, processors and third party administrators can use. Thus, rather than requiring an individual or company to provide documentation regarding purchases made with flexible spending account payment cards, the authorization and settlement procedures can be used to supply the information expeditiously. Similarly, rather than requiring a retailer to provide to a third party administrator or its processor a list of items that were purchased with a flexible spending account payment card via a direct connection between the retailer (or retailer's agent) and the third party administrator—a system that involves a great amount of overhead in view of the fact that the retailer would have to configure a direct connection with each and every third party administrator—present embodiments of the invention avoid such overhead and do not require retailers to support different database extract formats for different third party administrators and/or processors for third party administrators, nor do such embodiments require the third party administrators and/or processors to support the receipt of different formats, media, and communications methods for different retailers.

A benefit of one embodiment of the invention can allow the real-time substantiation of qualified amounts for payment card expenditures from flexible spending accounts, thereby reducing the costs associated with flexible spending accounts and the related substantiation requirements.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well. Furthermore, the embodiments of the invention may be embodied as code stored in a computer-readable memory of virtually any kind including, without limitation, RAM, ROM, magnetic media, optical media, or magneto-optical media. Even more generally, the embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents, including the matter incorporated by reference.

What is claimed is:

1. A method of authorizing a payment transaction request through a payment network for a product under a flexible spending account of a consumer, said method comprising a plurality of steps, each said step being performed by one or more network devices by the execution of software, each said network device being in communication with the payment network, wherein the steps include:

obtaining a flexible spending account identifier for the flexible spending account, and a product inventory code corresponding to the product;
forming a payment network authorization request message requesting use of the flexible spending account for the payment transaction for the product, wherein the payment network authorization request message includes:
the flexible spending account identifier for the flexible spending account;
the product inventory code corresponding to the product;
a total purchase amount for the product; and
an address of a merchant;
sending the payment network authorization request message from the address of the merchant to an address of an acquirer for the merchant;
sending the payment network authorization request message from the address of the acquirer for the merchant to an address of a payment network system;
sending the payment network authorization request message from the address of the payment network system to an address of an issuer of the flexible spending account;
determining, using the payment network authorization request message, that the flexible spending account identifier is valid by matching the flexible spending account identifier against a stored set of flexible spending account identifiers, and if so then:
determining that the product inventory code matches a qualified product category under the flexible spending account, and if so then:
determining a qualified amount of the total purchase amount eligible for use of the flexible spending account for the payment transaction for the product, and if so then:
determining that the flexible spending account for the payment transaction has sufficient assets for paying the qualified amount of the total purchase amount, and if so, then:
sending, in response to the payment network authorization request message, an authorization response from the address of the issuer to the address of the payment network system, wherein the authorization response includes the qualified amount of the total purchase amount eligible for use of the flexible spending account for the payment transaction for the product and an authorization for the use of the flexible spending account payment for the payment transaction;
sending the authorization response from the address of the payment network system to the address of the acquirer for the merchant;
sending the authorization response from the address of the acquirer for the merchant to the address of the merchant.

2. The method as claimed in claim 1, wherein said payment network authorization request message further comprises a description field for the matching said obtained product inventory code.

3. The method as claimed in claim 1, wherein said payment network authorization request message further comprises tax on the product.

4. The method as claimed in claim 1, wherein said payment network authorization request message further comprises, for each of a plurality of different said products:
the product inventory code for the respective said product; and
the total purchase amount for the respective said product.

5. The method as claimed in claim 4, wherein said payment network authorization request message further comprises, for each of a plurality of different said products, the description field for the respective said product.

6. The method as claimed in claim 1, wherein the steps further comprise accessing a set of said qualified product categories eligible for usage under said flexible spending account.

7. The method as claimed in claim 1, wherein the steps further comprise:
receiving a plurality of said payment network authorization request messages from a plurality of said merchants at the address of the issuer of said flexible spending account;
grouping the payment network authorization request messages received from said plurality of said merchants and associated with the particular flexible spending account as a set of transaction records; and
sending said set of said transaction records from an address of said issuer to an address of an auditor.

8. The method as claimed in claim 1, wherein the steps further comprise appending said payment network authorization request message to a payment network settlement record.

9. The method as claimed in claim 8, wherein the steps further comprise utilizing said payment network settlement record to complete payment for the payment transaction while forwarding said payment network authorization request message to an address of an auditor for monitoring flexible spending account compliance.

10. The method as claimed in claim 1, wherein:
the obtaining of the flexible spending account identifier for the flexible spending account and the product inventory code corresponding to the product are obtained at an electronic Point Of Service terminal (POS); and
the steps further comprise receiving the authorization response at the POS.

11. The method as claimed in claim 1, wherein the steps further comprise, when the qualified amount of the total purchase amount eligible for use of the flexible spending account for the payment transaction for the product is for a partial amount of the total purchase price, receiving input acknowledging payment, via a payment source other than the flexible spending account, for the difference between the total purchase amount for the product and the qualified amount of the total purchase for the product.

12. The method as claimed in claim 11, wherein the steps further comprise completing a sale of other said products requested for purchase in the payment transaction.

13. A method of authorizing a payment transaction through a payment network for a plurality of different products under a flexible spending account of a consumer, said method comprising a plurality of steps, each said step being performed by one or more network devices by the execution of software, each said network device being in communication with the payment network, wherein the steps include:
obtaining a flexible spending account identifier for the flexible spending account, and a product inventory code corresponding to each said product in the plurality of different products;
forming a payment network authorization request message requesting use of the flexible spending account for the payment transaction for the respective said products, wherein said payment network authorization request message includes:
the flexible spending account identifier for the flexible spending account;
an address of a merchant; and
for each of the respective said products:
a total purchase amount for the product; and
the product inventory code corresponding to the product;
sending the payment network authorization request message from the address of the merchant to an address of an acquirer for the merchant;
sending the payment network authorization request message from the address of the acquirer for the merchant to an address of a payment network system;
sending the payment network authorization request message from the address of the payment network system to an address of an issuer of the flexible spending account;
determining, using the payment network authorization request message, that the flexible spending account identifier is valid by matching the flexible spending account identifier against a stored set of flexible spending account identifiers, and if so then for each of the respective said products:
determining that the product inventory code matches a qualified product category under the flexible spending account, and if so then:
determining a qualified amount of the total purchase amount eligible for use of the flexible spending account for the payment transaction for the product;
and
determining that the flexible spending account for the payment transaction has sufficient assets for paying a summation of the qualified amounts of the total purchase amount eligible for use of the flexible spending account for the payment transaction for the plurality of different products, and if so then:
sending, in response to the payment network authorization request message, an authorization response from the address of the issuer to the address of the payment network system, wherein the authorization response includes:
the summation of the qualified amounts of the total purchase amount eligible for use of the flexible spending account for the payment transaction for the plurality of different products; and
an authorization for the use of the flexible spending account payment for the payment transaction;
sending the authorization response from the address of the payment network system to the address of the acquirer for the merchant; and
sending the authorization response from the address of the acquirer for the merchant to the address of the merchant.

14. The method as claimed in claim 13, wherein the steps further comprise completing a sale of other said products in the payment transaction.

15. The method as claimed in claim 13, wherein the steps further comprise utilizing said payment network authorization request message to monitor compliance with terms of said flexible spending account.

16. The method as claimed in claim 13, wherein the steps further comprise:
preparing a transaction record of said payment transaction; and
sending said transaction record to an address of an auditor of said flexible spending account.

17. The method as claimed in claim 16, wherein the steps further comprise:

receiving a plurality of said transaction records from a plurality of said merchants at the issuer of said flexible spending account;

grouping the transaction records received from said plurality of said merchants and associated with the flexible spending account as a set of said transaction records; and sending said set of said transaction records from the address of said issuer to the address of the auditor.

18. The method as claimed in claim 16, wherein the steps further comprise:

appending said transaction record to a payment network settlement record; and sending the transaction record to the address of the issuer.

19. The method as claimed in claim 18, wherein the steps further comprise utilizing said payment network settlement record to complete payment for the payment transaction while forwarding said transaction record to the address of the auditor for monitoring flexible spending account compliance.

20. The method as claimed in claim 16, wherein the steps further comprise utilizing said transaction record to monitor compliance with terms of said flexible spending account.

21. A method of submitting product information of a flexible spending account for processing by an auditor of the flexible spending account, the method comprising a plurality of steps, each said step being performed by one or more network devices by the execution of software, each said network device being in communication with a payment network, wherein the steps include:

preparing a transaction record for a transaction with a consumer for purchase of a product with the flexible spending account, wherein the transaction record includes:

a product description field for the product;

a purchase amount field for the product; and a tax amount field for the product;

sending data in the transaction record from an address of a merchant to an address of an acquirer for the merchant;

sending data in the transaction record from the address of the acquirer of said merchant to an address of a payment network system;

sending data in the transaction record from the address of the payment network system to an address of an issuer of the flexible spending account;

sending data in the transaction record from the address of the issuer to an address of an agent of the issuer;

determining, using predetermined program compliance rules for the flexible spending account, whether the transaction with the consumer for purchase of the product with the flexible spending account is permissible;

receiving, when the transaction is determined to be permissible, from the address of the agent of the issuer to the address of the issuer, a qualified amount of the total purchase amount eligible for use of the flexible spending account for the payment transaction for the product;

determining that the flexible spending account for the payment transaction has sufficient assets for paying the qualified amount of the total purchase amount, and if so then:

sending an authorization response from the address of the issuer to the address of the payment network system, wherein the authorization response includes the qualified amount of the total purchase amount eligible for use of the flexible spending account for the payment transaction for the product and an authorization for the use of the flexible spending account payment for the payment transaction;

sending the authorization response from the address of the payment network system to the address of the acquirer for the merchant; and sending the authorization response from the address of the acquirer for the merchant to the address of the merchant.

22. The method as claimed in claim 21, wherein:

the flexible spending account identifier for the flexible spending account and the product inventory code corresponding to the product are input to an electronic Point Of Service terminal (POS); and the steps further comprise receiving the authorization response at the POS.

23. The method as claimed in claim 21, wherein the steps further comprise, when the qualified amount of the total purchase amount eligible for use of the flexible spending account for the payment transaction for the product is for a partial amount of the total purchase price, receiving input acknowledging payment, via a payment source other than the flexible spending account, for the difference between the total purchase amount for the product and the qualified amount of the total purchase for the product.

24. The method as claimed in claim 21, completing a sale of other said products requested for purchase in the payment transaction.

* * * * *

UNITED STATES PATENT AND TRADEMARK OFFICE
CERTIFICATE OF CORRECTION

PATENT NO.       : 7,650,308 B2                              Page 1 of 1
APPLICATION NO. : 11/230761
DATED            : January 19, 2010
INVENTOR(S)      : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 612 days.

Signed and Sealed this

Twenty-eighth Day of December, 2010

David J. Kappos
*Director of the United States Patent and Trademark Office*